(12) United States Patent
Ito et al.

(10) Patent No.: US 6,369,875 B1
(45) Date of Patent: Apr. 9, 2002

(54) SLIDABLE ASSEMBLY INCLUDING SLIDER PIECES WITH AN UPPER AND LOWER PART

(75) Inventors: Tetsushi Ito; Makoto Masuda, both of Nara; Yasuhiro Ono, Kyoto, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/475,235

(22) Filed: Dec. 30, 1999

(30) Foreign Application Priority Data

Jan. 26, 1999 (JP) .......................................... 11-017198

(51) Int. Cl.$^7$ .......................... G03B 27/52; G03G 15/04
(52) U.S. Cl. ......................................... 355/43; 399/211
(58) Field of Search ............................ 355/43, 40, 49, 355/60, 67; 399/211, 212; 384/15, 13, 45, 40, 55

(56) References Cited

U.S. PATENT DOCUMENTS

| | | | | |
|---|---|---|---|---|
| 5,102,235 A | * | 4/1992 | Mugglestone | 384/45 |
| 5,897,145 A | * | 4/1999 | Kondo et al. | 385/93 |
| 5,975,930 A | * | 11/1999 | Matsuura et al. | 439/157 |
| 6,170,986 B1 | * | 1/2001 | Hsu et al. | 384/15 |
| 6,191,938 B1 | * | 2/2001 | Ohgami et al. | 361/681 |
| 6,201,559 B1 | * | 3/2001 | Wada et al. | 347/236 |
| 6,201,688 B1 | * | 3/2001 | Leman | 361/681 |

FOREIGN PATENT DOCUMENTS

JP         8-265510         10/1996

* cited by examiner

*Primary Examiner*—David M. Gray
*Assistant Examiner*—Peter B. Kim

(57) ABSTRACT

A first slidable assembly provided in an image reading unit of a digital copier has the slider pieces attached to the frame of the slidable assembly body thereof so that the slider pieces will move sliding over the guide elements. The upper part of the slider piece is an insert portion which is fitted through a passage hole formed in the frame and has engaging portions that pass through the passage hole as being deformed and become engaged with the rim of the passage hole.

10 Claims, 5 Drawing Sheets

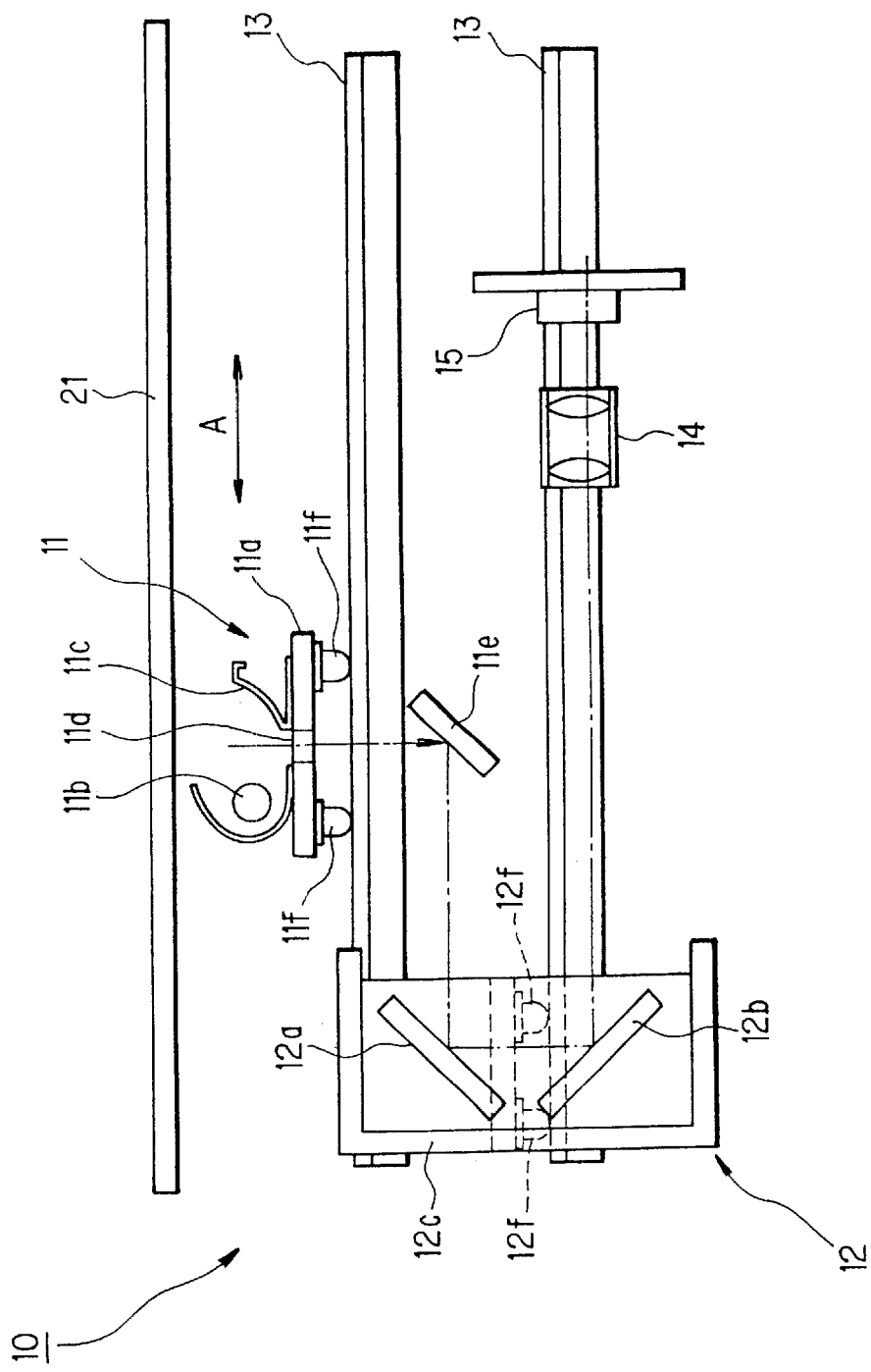

SLIDABLE ASSEMBLY INCLUDING SLIDER PIECES WITH AN UPPER AND LOWER PART

BACKGROUND OF THE INVENTION

(1) Field of the Invention

The present invention relates to a slidable assembly which travels along the image of an original document in order to read the original image, in an image reading unit, scanner unit etc., provided in an image forming apparatus such as a copier, printer, facsimile machine.

(2) Description of the Prior Art

A typical digital copier has a pair of slidable assemblies which are made to travel along the original table, in order that an image reading unit can optically read the image of an original placed on the original table. One, the first, slidable assembly is composed of a light source for illuminating the original placed on the original table and a reflection mirror for reflecting the reflected light from the original illuminated by the light source. The other, the second, slidable assembly has a pair of reflection mirrors which deflect the light from the reflected mirror from the first slidable assembly to the opposite direction. Both the slidable assemblies are moved in the same direction along the original table. The light emitted from the light source provided in the first slidable assembly to the original placed on the original table is reflected by the original. The reflected light is further reflected by a pair of reflection mirrors on the second slidable assembly which is disposed at a site opposite to the scan direction and deflected by 180° so that the reflected light will be incident on the photoelectric converting layer of a photoelectric conversion device fixed at the predetermined position.

The traveling speed of each slidable assembly is set so that the optical length of the light reflected from the original to reach the photoelectric conversion device is constant.

Each slidable assembly extends in the direction perpendicular to the scan direction in order to illuminate the whole face of the original placed on the original table, each end being guided along the flat surface of a corresponding guide element arranged in the scan direction.

Slider pieces which slide in contact with the flat surface of the guide elements are attached at the ends of the slidable assembly. Each slider piece is made up of a resin or the like that has a low coefficient of friction against the guide element and is secured to the slidable assembly by, usually, screws etc., However, since screws etc. are needed to attach the slider pieces at predetermined positions in the slidable assembly body of the slidable assembly of the above configuration, assembling takes up time, thus producing a loss of economy. Further, a long use of the slider pieces that frictionally move over the guide elements may cause such risks that the frictional force against the guide element may wear the slider pieces or a strong stress may act on the portions fixed by screws etc., damaging the slider pieces. Once a slider piece breaks, the replacement work needs time and labor for repairs, resulting in degraded service performance.

SUMMARY OF THE INVENTION

The present invention has been devised to solve the above problems and it is therefore an object of the present invention to provide a slidable assembly wherein slider pieces sliding on the guide elements can readily be attached to the slidable assembly body and yet the slider pieces can be positioned appropriately and the slider pieces are free from unwanted vibrations, which can prevent generation of chattering sounds from unstable sliding.

In order to achieve the above object, the present invention is configured as follows:

In accordance with the first aspect of the present invention, a slidable assembly comprises: a slidable assembly body; and slider pieces sliding over guide elements and attached to the slidable assembly body, the upper part of the slider piece being an insert portion which is fitted through a passage hole formed in the slidable assembly body and has engaging portions that deform so as to pass through the passage hole and become engaged with the rim of the passage hole, wherein each engaging portion is deformed in a direction different from the sliding direction.

In accordance with the second aspect of the present invention, the slidable assembly having the above first feature is characterized in that the passage hole has a shape that is elongated in the sliding direction of the slider piece and the insert portion of the slider piece has a cross-section similar to that of the insert hole.

In accordance with the third aspect of the present invention, the slidable assembly having the above first feature is characterized in that the slider piece has a flange which holds the rim of the passage hole in cooperation with the engaging portions when the insert portion has been fitted through the passage hole.

BRIEF DESCRIPTION OF THE DRAWINGS

FIG. 3 is an overall front view showing the image reading unit;

DESCRIPTION OF THE PREFERRED EMBODIMENTS

The embodiment of the present invention will hereinafter be described in detail with reference to the accompanying drawings.

Figure 1:
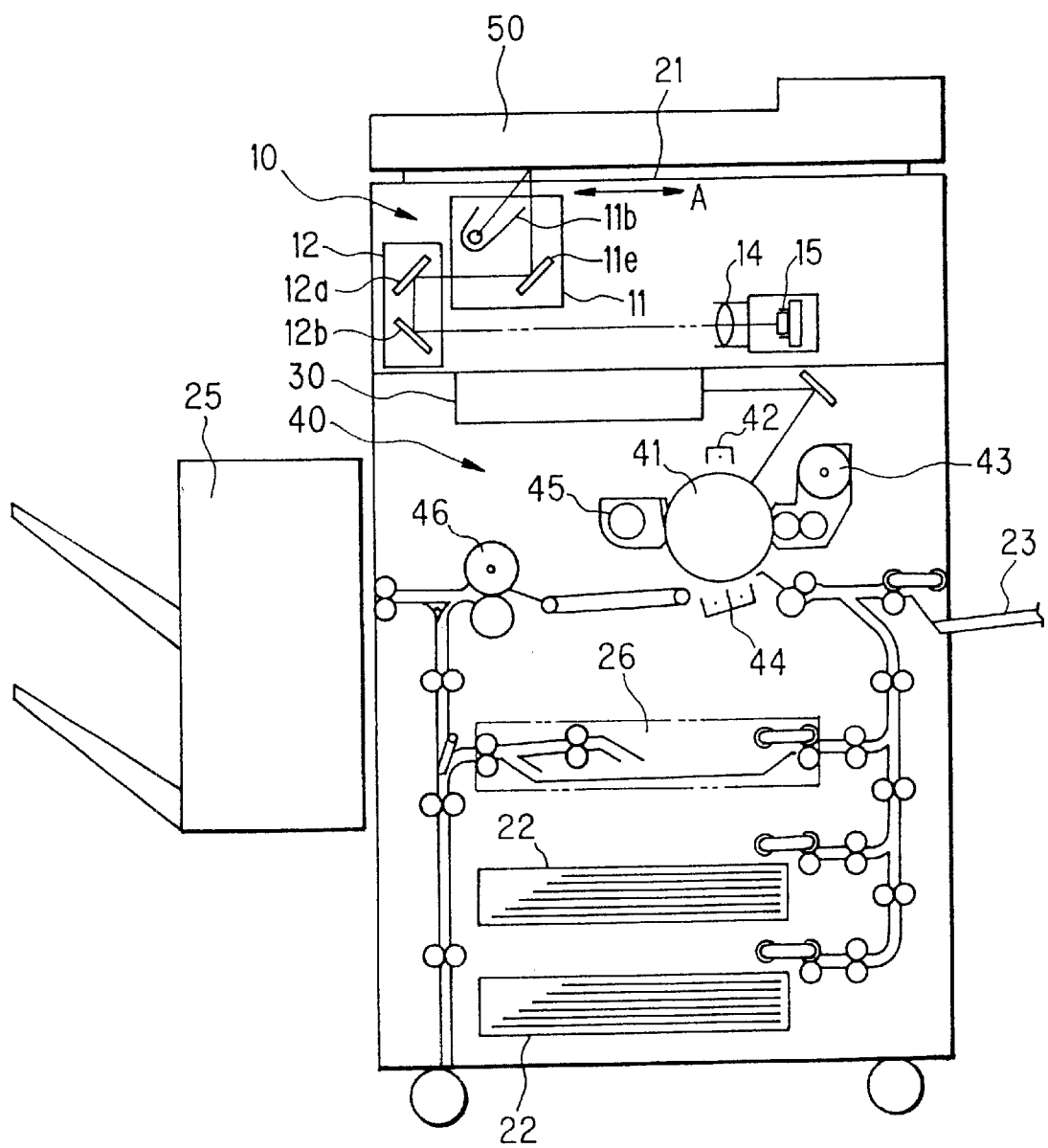
FIG. 1 is an overall view showing a configuration of a digital copier having an image reading unit with a slidable assemblies of the present invention.

FIG. 1 is an overall constructional view showing an example of a digital copier in which slidable assemblies of the present invention are provided. This digital copier includes: an original table 21 of transparent glass arranged horizontally on the top; an image reading unit 10 for reading an image of an original placed on this original table 21; an electrophotographic process unit 40 for forming an image of the original captured by image reading unit 10; and an automatic document feeder 50 set on the upper side of original table 21.

Automatic document feeder 50 feeds documents one by one from a multiple number of originals set on the predetermined document tray onto original table 21. The original thus fed and set facedown on original table 21 is read by image reading unit 10. Automatic document feeder 50 discharges the original from original table 21 after its image has been captured and feeds a next document onto original table 21. Further, in order to allow the images on both sides of a document to be read by image reading unit 10, automatic document feeder 50 is configured so that an original once fed to original table 21 can be inverted and fed again onto original table 21.

In image reading unit 10, first and second slidable assemblies 11 and 12 can move along original table 21 to scan the image of an original placed on original table 21. That is, light of the image reflected from the original passes through focusing lens 14 and is optically picked up by means of a photoelectric conversion device 15. The image data of the original captured by photoelectric conversion device 15 is temporarily stored in the memory for a laser writing unit 30. Laser writing unit 30 emits a laser beam that is modulated based on the image data stored in the memory, to a photosensitive drum 41 in electrophotographic process unit 40.

The modulated laser beam emitted from laser writing unit 30 irradiate photosensitive drum 41 in electrophotographic process unit 40. Photosensitive drum 41 has a photosensitive layer electrified by a charger 42 and is adapted to be irradiated with the modulated laser beam emitted from laser writing unit 30. This exposure to the laser beam forms a static latent image in the photosensitive layer. The static latent image formed in the photosensitive layer is developed into a toner image on the photosensitive layer by means of a developing unit 43.

Print paper is stored in a multiple number of paper feed trays 22. Print paper from one of the multiple paper feed trays 22 or from a manual feed tray 23 is fed toward photosensitive drum 41. The toner image formed on the photosensitive layer of photosensitive drum 41 is transferred to the thus fed print paper by means of a transfer device 44. The leftover toner remaining on the surface of photosensitive drum 41 after the toner image has been transferred is removed by a cleaning device 45.

The toner image transferred to the print paper is fixed onto the print paper by means of a fixing unit 46. The print paper with a toner image fixed thereon is discharged to a sorter 25 if the image is formed on one side only. On the other hand, when images are printed on both sides of the print paper, the print paper is fed to a duplex copy unit 26 where it is turned upside down and fed again to photosensitive drum 41 so as to perform image formation on the side which has not been image formed. Then the print paper is discharged to sorter 25.

Figure 2:
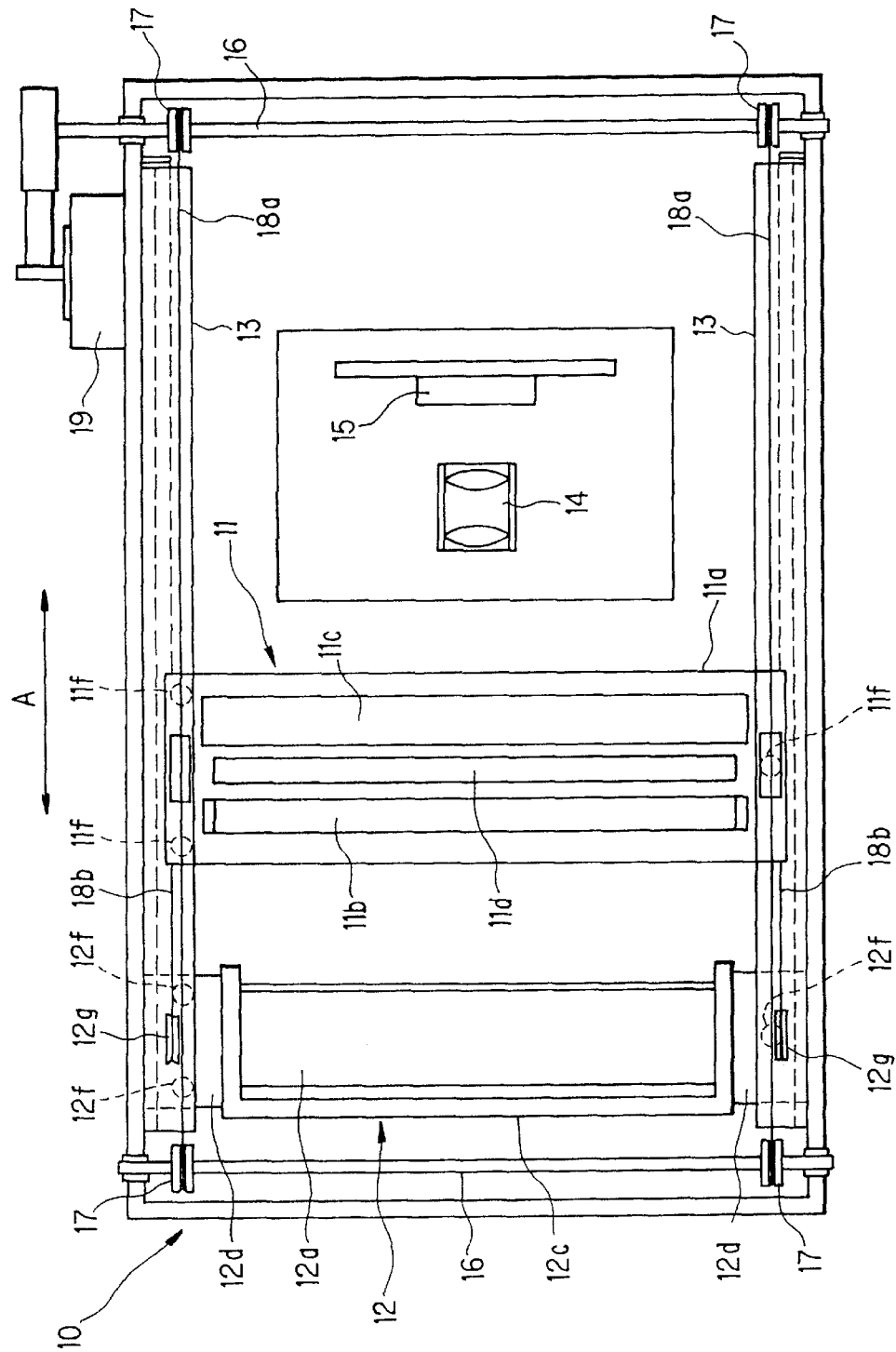
FIG. 2 is an overall plan view showing the image reading unit provided for the digital copier.

FIG. 2 is an overall plan view showing image reading unit 10 and FIG. 3 is a front view showing the essential components thereof. Image reading unit 10 has a pair of first and second slidable assemblies 11 and 12 which run along original table 21. First and second slidable assemblies 11 and 12 each have a slidable assembly body extending across the width of original table 21 of a rectangular shape. The end portions of each slidable assembly body are placed under the respective lengthwise side edge portions of original table 21. Second slidable assembly 12 is located under original table 21 at one end thereof with respect to the longitudinal direction. First slidable assembly 11 is located at a position closer to the center of original table 21 compared to second slidable assembly 12.

Arranged under each side edge portion of original table 21 are a pair of guide elements 13 or upper and lower elongated plates which each has a flat top face as a guide surface. Attached at the side portions of each slidable assembly body are slider pieces 11$f$ or 12$f$ made up of resin having a low coefficient of friction against guide elements 13. Slider pieces 11$f$ of first slidable assembly 11 slide in contact with upper guide elements 13 while slider pieces 12$f$ of second slidable assembly 12 slide in contact with lower guide elements 13.

The slidable assembly body of first slidable assembly 11 comprises a frame 11$a$ of a long plate extending across the width of original table 21 and a xenon lamp 11$b$ as a light source provided on frame 11$a$. Xenon lamp 11$b$ is disposed along the width of original table 21 and on the side closer to second slidable assembly 12. A lamp reflector 11$c$ is arranged along xenon lamp 11$b$ on frame 11$a$ on the far side from second slidable assembly 12. Light radiated through the aperture of xenon lamp 11$b$ will directly illuminate the original placed on original table 21 and also will be reflected by reflector 11$c$ and illuminate the original.

A slit 11$d$ for allowing the reflected light from the original placed on original table 21 to pass therethrough is provided along the longitudinal direction of xenon lamp 11$b$ in the middle portion, with respect to the width of frame 11$a$, between xenon lamp 11$b$ and lamp reflector 11$c$. A reflection mirror 11$e$ reflecting the light having passed through slit 11$d$ toward second slidable assembly 12 is provided under, and integrally with frame 11$a$.

Figure 4A:
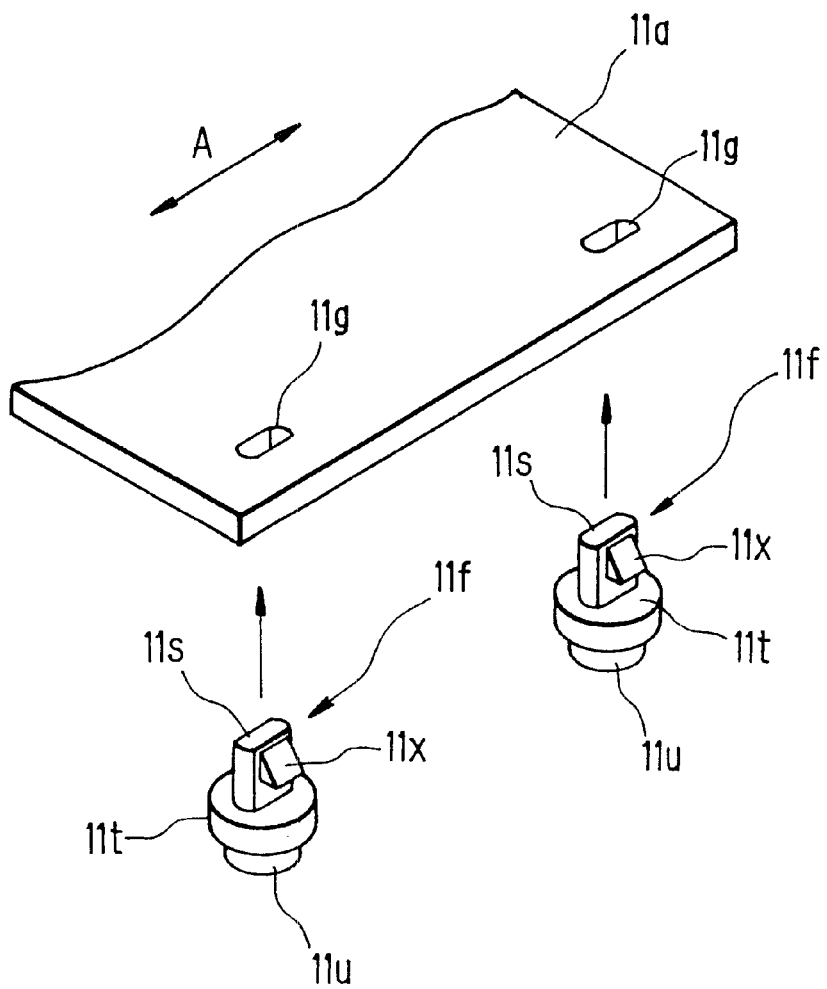
FIG. 4A is a perspective view showing essential components of the first slidable assembly of the present invention provided for the image reading unit.
Figure 4B:
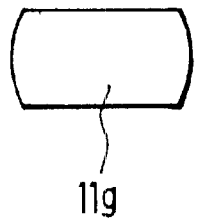
FIG. 4B is a plan view showing a passage hole formed in the first slidable assembly.

Attached to frame 11$a$ at the ends opposing the top faces of guide elements 13 are slider pieces 11$f$ which slide in contact with the top, flat guide surfaces of guide elements 13. FIG. 4A is a perspective, exploded view showing one end of frame 11$a$. A pair of passage holes 11$g$ are formed apart, as appropriate, from each other in the scan direction of first slidable assembly or in the longitudinal direction of guide frame 13, at one end portion of frame 11$a$ whereas a single passage hole 11$g$ is formed at the middle portion in the longitudinal direction of guide element 13, at the other end portion of frame 11$a$. Slidable pieces 11$f$ are attracted to these passage holes 11$g$. As shown in FIG. 4B, each passage hole 11$g$ has an oval shape with its long axis oriented in the scan direction A. More specifically, the inner peripheral surface of the hole is defined by two cylindrical inner portions at both ends with respect to the longitudinal axis and two flat inner portions parallel to each other along the longitudinal direction of the oval.

Figure 5A:
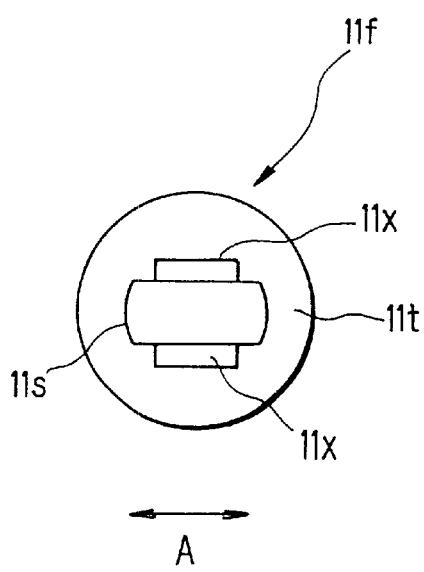
FIG. 5A is a plan view showing a slider piece formed in the first slidable assembly.
Figure 5B:
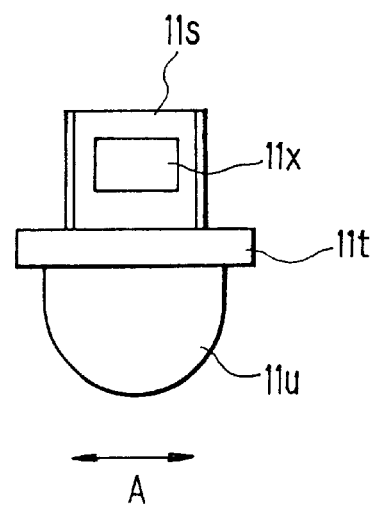
FIG. 5B is a front view showing the slider piece.
Figure 5C:
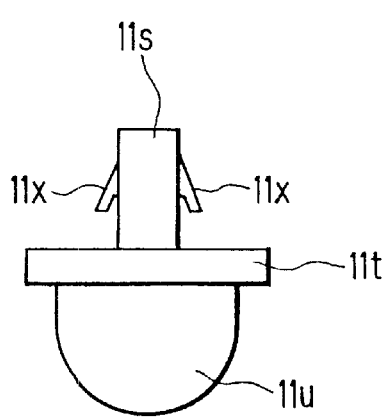
FIG. 5C is a side view of the slider piece and FIG. 5D is a partial enlarged view of the slider piece.
Figure 5D:
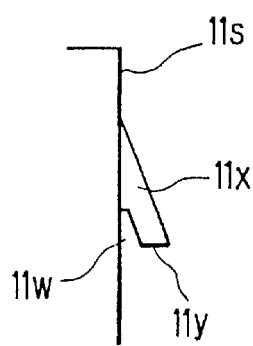

FIG. 5A is a plan view showing slider piece 11$f$, FIG. 5B is a front view thereof, FIG. 5C is a side view thereof and FIG. 5D is a partial enlarged view thereof. Slider piece 11$f$ is made up integrally of a resin material having a low coefficient of friction against guide elements 13 and is configured of a top insert portion 11$s$ to be inserted into passage hole 11$g$ in frame 11$a$, a disc-like flange 11$t$ formed horizontally under insert portion 11$s$ and a sliding contact portion 11$u$ formed under flange 11$t$.

Insert portion 11$s$ of slider piece 11$f$ is of a columnar portion having a section approximately identical with that of passage hole 11$g$. The columnar portion, i.e., insert portion 11$s$ is defined by two cylindrical surface portions extending vertically and disposed at both ends with respect to the scan direction A and two flat side faces extending vertically and having a normal that is perpendicular to the scan direction.

A flexible engaging portion 11$x$ is formed on each of the flat side faces of insert portion 11$s$. Each engaging portion 11$x$ is formed of a triangular prism shape placed horizontally or is configured such that the upper edge thereof originates from a upper point of insert portion 11$s$ and becomes projected sidewards toward its lower edge thereof. Further, as shown in FIG. 5D, a cutout portion 11w is formed between the side face and the proximal end of the insert portion near the flange 11t side. Accordingly, the distal part of each engaging portion 11x forms a cantilever 11y which defines cutout portion 11w together with the side face of insert portion 11s. Therefore, cantilever 11y of each engaging portion 11x is configured so as to be able to flex closer to the side face of insert portion 11s.

The side to side distance (width) of the columnar portion or insert portion 11s is set marginally smaller than the width of passage hole 11g so that cantilevers 11y of engaging portions 11x will pass through passage hole 11g when insert portion 11s is inserted into passage hole 11g. Each engaging portion 11x formed on insert portion 11s passes through passage hole 11g and projected above frame 11a. In this state, engaging portions 11x and flange 11t hold frame 11a therebetween so that slider piece 11f is gripped and positioned vertically with respect to frame 11a.

The cylindrical surface portions at both the ends of insert portion 11s abut against the cylindrical surface portions of passage hole 11g, whereby slider piece 11f is prevented from backlash in the scan direction A relative to frame 11a of the slidable assembly body. Further, since the cross-section of insert portion 11s has an oval shape that is similar to the cross-section of passage hole 11g, insert portion 11s having been inserted in passage hole 11g has no risk of being rotated in passage hole 11g with respect to the vertical axis.

Sliding contact portion 11u formed on the lower side of disc-like flange 11t is projected downward as a hemisphere concentrically with flange 11t. The lowermost part of the hemisphere of sliding contact portion 11u will come in sliding contact with the top, flat guide surface of each guide element 13.

The slidable assembly body of second slidable assembly 12 arranged at the side of first slidable assembly 11 thus configured, is composed of, as shown in FIGS. 2 and 3, a first reflection mirror 12a for receiving the light reflected by reflection mirror 11e provided in frame 11a of first slidable assembly 11 and reflecting downwards, and a second reflection mirror 12b for reflecting the light reflected by this first reflection mirror 12a in the horizontal direction. First reflection mirror 12a and second reflection mirror 12b are held in a bracket 12c in such a manner that the two mirrors faces inwards but are inclined at complement angels to each other. Bracket 12c is a rectangular parallelepiped extending horizontally between guide elements 13 across the width of original table 21 and opening to the first slidable assembly 11 side. As shown in FIG. 2, a pair of horizontal frames 12d are formed extending over respective guide elements 13 from the left and right side faces of bracket 12c. A pair of slider pieces 12f are attached to one of frames 12d while one slider piece 12f is attached to other frame 12d. The configuration of each slider piece 12f is the same as slider piece 11f attached to frame 11a of first slidable assembly 11. The structure of attachment of slider piece 12f to each frame 12d has also the same structure as that of slider piece 11f to frame 11a of first slidable assembly 11.

Condenser lens 14 for condensing the light reflected by reflection mirrors 12a and 12b provided for second slidable assembly 12 is arranged under the central portion of original table 21. Light condensed by condenser lens 14 is incident on photoelectric conversion device (CCD) 15 arranged on the opposite side of second slidable assembly 12 with condenser lens 14 in between.

A pair of rotational shafts 16 extending across the width are arranged at both ends, with respect to the longitudinal direction, of original table 21. Rotation of a scanning motor 19 is transmitted to one of rotary shafts 16 so as to drive the shaft in normal and reverse directions. Each rotational shaft 16 has a pair of pulleys 17 attached at its ends correspondingly to guide elements 13. A wire 18a is wound around and between pulleys 17 corresponding to each guide element 13. These wires 18a are attached at both ends of slidable assembly body of first slidable assembly 11.

A moving pulley 12g is arranged at each end of second slidable assembly 12 and a wire 18b is wound around each moving pulley 12g. One end of each wire 18b extends to first slidable assembly 11 and attached thereto while the other end is fixed at a site beyond the terminal end of scanning movement of first slidable assembly 11.

In image reading unit 10 thus configured, as scanning motor 19 is rotated in the normal direction, each slider piece 11f of first slidable assembly 11 moves sliding over corresponding guide element 13 and the first slidable assembly 11 is moved in the direction A in FIG. 2. When first slidable assembly 11 is moved, a pair of moving pulleys 12g provided for second slidable assembly 12 is dragged by the first slidable assembly 11 so that second slidable assembly 12 also moves in the same direction. In this case, second slidable assembly 12 dragged by the pair of moving pulleys 12g will travel at half the speed of the first slidable assembly 11.

Slidable assembly 11 scans the full range of the document placed on original table 21. During scanning, all over the image of the document is illuminated by xenon lamp 11b mounted on first slidable assembly 11. Exposure light from the original is reflected by reflection mirror 11e of first slidable assembly 11 toward second slidable assembly 12 where the incident light is reflected again by a pair of reflection mirrors 12a and 12b provided on the second slidable assembly 12. Then the outgoing light passes through condenser lens 14 and is received by photoelectric conversion device 15.

For scanning, since second slidable assembly 12 runs at half the speed of first slidable assembly 11, second slidable assembly 12 only moves half the distance of the movement of first slidable assembly 11 when first slidable assembly scans all over the original placed on original table 21, so that the optical length of the exposure light emitted from xenon lamp 11b and reflected by the original to the fixed, photoelectric conversion device 15 is always at constant.

When the first and second slidable assemblies 11 and 12 are moved, slider pieces 11f and 12f which are formed of a resin material having a low coefficient of friction against guide elements 13 move sliding over guide elements 13 so that the first and second slidable assemblies 11 and 12 can travel smoothly.

Each slider piece 11f of the first slidable assembly can be positioned in place so as not to drop by fitting insert portion 11s and engaging portions 11x into passage hole 11d formed in frame 11a and hooking engaging portions 11x on the upper face of frame 11a. Thus, each slider piece 11f can readily be positioned and attached to frame 11a in the predetermined conditions.

Further, since slider pieces 11f are engaged with the slidable assembly body with little play with respect to the direction of movement of the slidable assembly, i.e., the scan direction A, no backlash in the scan direction A occurs and hence it is possible to prevent the slidable assembly body from being vibrated when it is moved sliding over guide elements 13. Since cantilever 11y of engaging portion 11x is adapted to flex in the direction perpendicular to the direction of movement of the slidable assembly, slider piece 11f will hardly become inclined with respect to slidable assembly body compared to the case where cantilever 11y flexes in the same direction as the movement of the slidable assembly. This configuration also contributes to prevention of occurrence of the vibration while the slidable assembly body is moving.

Further, since flange 11t of slider piece 11f abuts the slidable assembly body while slider piece 11f is held between slidable assembly body and guide element 13, the inclination of slider piece 11f is prevented more reliably.

In the above way, engaging portions 11x are deformed in the direction perpendicular to the direction of movement of the slidable assembly or the scan direction A so as to allow the slider piece to move in a direction different from the direction of movement of the slidable assembly when slider piece 11f is set into the slidable assembly body. Therefore, it is possible to diminish vibration of the slidable assembly body when the slidable assembly body moves whilst slider pieces 11f sliding over guiding elements 13.

Slider piece 12f of second slidable assembly 12 also has the same structure as above, it is possible to readily attach slider pieces 12f to frames 12d and place them at their predetermined positions. Further, there is no fear of the slider pieces coming out easily from frames 12d. Second slidable assembly 12 can also be prevented from vibrating to achieve a stable scanning operation.

As has been described heretofore, according to the slidable assembly of the present invention, the slider pieces can be readily attached and placed to the slidable assembly body at the predetermined positions. Further, there is no risk that the slider pieces in sliding contact with the guide elements may easily come out from the slidable assembly body. Moreover, the slider pieces can slide over the guide elements in a stable manner as their vibrations being suppressed.

What is claimed is:

1. A slidable assembly comprising:
a slidable assembly body; and slider pieces
the slider pieces having a lower part and an upper part, the lower part sliding over guide elements, the upper part of the slider pieces being an insert portion which is fitted through a passage hole formed in the slidable assembly body and has engaging portions that deform so as to pass through the passage hole and become engaged with a rim of the passage hole, wherein each engaging portion is deformed in a direction different from a sliding direction.

2. The slidable assembly according to claim 1, wherein the passage hole has a shape that is elongated in the sliding direction of the slider piece and the insert portion of the slider piece has a cross-section similar to that of the insert hole.

3. The slidable assembly according to claim 1, wherein the slider piece has a flange which holds the rim of the passage hole in cooperation with the engaging portions when the insert portion has been fitted through the passage hole.

4. The slidable assembly according to claim 2, wherein the passage hole has an oval shape with two flat parallel portions along the longitudinal axis of the oval shape and two cylindrical inner portions at ends of the oval with respect to the longitudinal axis.

5. The sliding assembly according to claim 1, wherein the slidable assembly includes means for emitting light.

6. The slidable assembly according to claim 5, wherein the slidable assembly includes means for allowing light to pass through.

7. The slidable assembly according to claim 1, wherein the lower part is in direct physical contact with the guide.

8. An image reading unit comprising:
a slidable assembly body; and slider pieces
the slider pieces having a lower part and an upper part, the lower part sliding over guide elements, the upper part of the slider pieces being an insert portion which is fitted through a passage hole formed in the slidable assembly body and has engaging portions that deform so as to pass through the passage hole and become engaged with a rim of the passage hole, wherein each engaging portion is deformed in a direction different from a sliding direction.

9. A slidable assembly comprising:
a slidable assembly body; and slider pieces;
the slider pieces having a lower part and an upper part, the lower part sliding over guide elements, the upper part of the slider pieces being a fixing means with respect to the slidable assembly body, and the fixing means being disposed with engaging portions that deform so as to become engaged with a rim of a fitting portion of slidable assembly body, wherein each engaging portion is deformed in a direction different from a sliding direction.

10. A slidable assembly comprising:
a slidable assembly body; and slider pieces;
the slider pieces having a lower part and an upper part, the lower part sliding over guide elements, the upper part of the slider pieces being an insert portion which is fitted through a passage hole formed in the slidable assembly body and has engaging portions that pass through the passage hole and become engaged with a rim of the passage hole, wherein the passage hole has a shape that is elongated in the sliding direction of the slider pieces and the insert portion of the slider pieces has a cross-section similar to that of the insert hole.

* * * * *